United States Patent [19]

Moore

[11] 4,109,019

[45] Aug. 22, 1978

[54] PROCESS FOR IMPROVED RUMINANT FEED SUPPLEMENTS

[76] Inventor: William Percy Moore, P.O. Box 943, Hopewell, Va. 23860

[21] Appl. No.: 766,758

[22] Filed: Feb. 8, 1977

Related U.S. Application Data

[63] Continuation-in-part of Ser. No. 633,029, Nov. 18, 1975, abandoned.

[51] Int. Cl.$^2$ .......................... A23K 1/06; A23K 1/22
[52] U.S. Cl. ...................................... 426/69; 426/471; 426/476; 426/624; 426/635; 426/641; 426/807
[58] Field of Search ................. 426/487, 635, 474, 31, 426/69, 623, 471, 624, 807, 54, 475, 476, 386, 656, 657; 260/96.5 R, 96.5 C

[56] References Cited

U.S. PATENT DOCUMENTS

| | | | |
|---|---|---|---|
| 3,586,515 | 6/1971 | Anderson | 426/471 X |
| 3,873,734 | 3/1975 | Higgins et al. | 426/807 X |
| 3,988,483 | 10/1976 | Deyoe et al. | 426/476 |

*Primary Examiner*—R. B. Penland

[57] ABSTRACT

An improved two step method for producing feeds for ruminant animals whereby carbamides, particularly urea and biuret, are reacted with fermented proteinaceous agricultural products and wastes with the aid of an aliphatic dicarboxylic acid catalyst to produce a highly palatable nutritive feed which releases protein and protein equivalent nitrogen in a slow and controlled manner in the rumen.

First stage of the method mechanically destroys the cellular structure of the fermented agricultural products and wastes, removes unpalatable acids, aldehydes and amines by stripping with hot gas, and partially completes the adduct-forming reaction between proteinaceous sugars, fats, and cellulose in the fermented material and the carbamides in a homogeneous liquid phase at temperatures of between 80° and 100° C. In the second stage, adduct reaction and drying is completed in a hot gas fluidized reactor at temperatures between 100° and 150° C.

5 Claims, 1 Drawing Figure

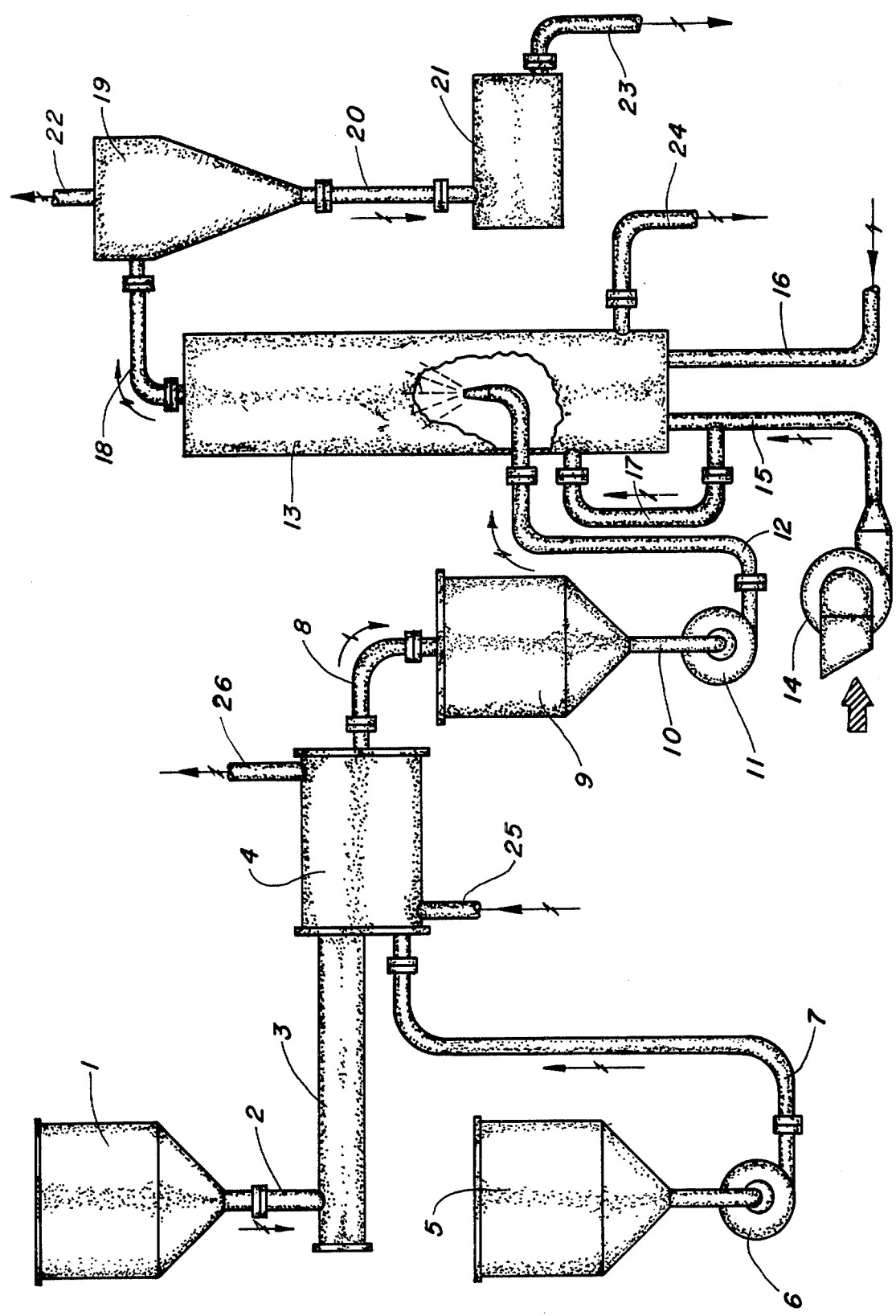

PROCESS FOR IMPROVED RUMINANT FEED SUPPLEMENTS

CROSS-REFERENCE TO RELATED APPLICATIONS

This application is a continuation-in-part of my co-pending application Ser. No. 633,029 filed Nov. 18, 1975, now abandoned.

BACKGROUND OF THE INVENTION

This invention relates to ruminant feeds and feed supplements containing protein and protein equivalent nitrogen which releases at a slow and substantially even rate in the rumen of cattle, sheep, or other ruminating animals. More particularly, it relates to a new method for converting fermented proteinaceous agricultural products and wastes to ruminant feeds, having properties of slow nitrogen release, by reaction with liquid carbamides and aliphatic dicaroxylic acids.

Ruminants such as cows, sheep, and goats form a special class of animals because of their digestive systems. Ruminants have a complex stomach which consists of several compartments. The first compartment, known as the rumen, contains numerous microorganisms which break down ingested proteins and amino acids into other compounds, such as ammonia. The ammonia is simultaneously synthesized into microbial protein in the rumen for digestion and absorption further down the digestive tract.

The rapidity with which the microorganisms in the rumen break down the ingested nitrogen compounds has limited the efficiency with which a ruminant natural proteins and severely limits the amount of synthetic nitrogen compounds which may be fed. Urea is the most common synthetic nitrogen compound fed to ruminants. Urea is degraded to ammonia and carbon dioxide very rapidly by the Urease enzymes present in the rumen. When urea is fed at a rate appreciably higher than the rate at which ammonia can be effectively utilized by the animal, the ammonia concentration in the rumen increases rapidly causing toxicity and frequently death.

It has been long postulated that an important improvement in feeds for ruminant animals would be achieved if a feed containing large amounts of low cost protein equivalents could be prepared which would release them at about the same rate the animal could safely utilize them.

There has been no successful method for combining the relatively low level and generally insoluble natural protein in fermented agricultural by-products and wastes with the low cost synthetic nitrogen chemicals such as urea, to produce a slow-releasing ruminant feed product. There have been several not completely successful efforts to dispose of fermented agricultural wastes in innocuous forms into the environment, but no product has been found which can be economically produced, shipped, and effectively fed to ruminant animals and at the same time solve a serious pollution or waste disposal problem for the industries producing very large amounts of fermented agricultural wastes.

Fermented agricultural products is used here to describe materials which were grown as vegetable, forage, or grain crops and which have been fermented by natural or industrial processes. The fermented agricultural products may be materials having appreciable value, such as corn silage, but they would usually be materials considered wastes such as municipal garbage and cattle feed lot manures.

Efforts to effectively use fermented agricultural products such as municipal garbage and manures as protein enriched feed supplements have not been successful to date. Corn silage is widely used as a feed for ruminant animals, but it has not been possible to react the silage with urea to produce a crude protein enriched feed with slow release properties. Problems with these products have been primarily caused by poor palatability and toxicity caused by incomplete or poor reaction of the synthetic nitrogen chemicals, such as urea, with the chemicals produced by fermentation of polysaccharides in the agricultural products.

Although the technology for separating municipal garbage mechanically into components for recycle of valuable components, such as paper, metals, and plastics, no method has been devised for the use of the organic portion of the garbage. This material has until now constituted a troublesome and expensive disposal problem.

An important improvement in ruminant feeds would be obtained if feeds containing high crude protein equivalents could be produced from low cost synthetic chemicals such as urea and fermented agricultural products and wastes, which would release the protein and protein equivalents at substantially the same rate at which they could be effectively and safely utilized.

To be effective, the process would leave the natural materials such as amino acids in such a condition that they could be digested and absorbed in subsequent parts of the gastrointestinal tract, such as the abomasum and the small intestine, and the process would convert the fermented and normally putrescible agricultural wastes to a feed which would be highly palatable to ruminant animals.

Several attempts to achieve such a process for producing ruminant feeds have been made by those in the art with none of the processes providing satisfactory controlled release of ammonia from the urea or other carbamides without damaging the agricultural product, or by-product feedstuffs in the product. An even greater problem has been the poor ruminant palatability of the products of the prior art processes.

Encapsulation of synthetic nutritive chemicals has been attempted. The aim has been to have the capsule dissolve slowly in the rumen and release the capsule contents primarily in the abomasum. No effective encapsulating agent has yet been found. Although technique might have merit for treating costly materials such as methionine, processing costs preclude improvement of commodity materials such as urea, biuret, corn silage, municipal garbage, or feedlot manures.

Other methods now used for combining synthetic chemicals with feedstuffs involve mechanical blending of the solid materials, and blending liquid chemicals or aqueous solutions of the chemicals with feedstuffs. The normal method involves blending of the materials and providing little or no reaction or protection of the synthetic chemicals, so that they are released almost instantly in the rumen. The toxicity of simple synthetic nutritive chemicals severely limits the amount of these low cost materials which can be safely used. For example, urea is normally used to substitute for only 3–15% of the protein intake of cattle on feed.

When the solid or liquid materials are heated with feedstuffs, the present practice is to heat in a drum dryer, such as an alfalfa dehydrator. The amount of contact between the natural feedstuffs and the synthetic nutritional chemicals is limited unless the material is held in the drum for an extended period of time. Material retention in an alfalfa type dehydrator is about 5–20 minutes. This extended retention time severely limits the temperature, which may be used to carry out reactions, because the feedstuffs will be degraded. In dehydration of natural feedstuffs, such as alfalfa or corn plant, caramelization of the products is a common problem. The heat-time combination of present drying techniques, which might be used to carry out reaction of nutritive chemicals, causes the caramelization which decreases the palatability of the feeds, frequently to the point of reduced animal feed consumption. Reduced consumption, of course, means slower animal growth rates, and increased animal production costs.

However, none of the aforementioned methods have been used successfully to react carbamides, such as urea with fermented agricultural products and wastes to produce palatable ruminant feeds which release nitrogen, protein equivalents, slowly for effective utilization by ruminant animals.

The animal feed industry has sought, without success, a practical method for preparing palatable animal feeds which release protein equivalents slowly and effectively utilizing carbamides without danger of toxicity and fermented agricultural product and wastes. A method for upgrading and safe utilization of waste by-products from agricultural industry has also been long sought after, because these wastes are objectionable or dangerous discharges to the environment, and the low feed value and non-palatable content of wastes has to now precluded use.

SUMMARY OF THE INVENTION

It is an object of this invention to provide a method of preparing highly palatable ruminant feeds which relese crude protein equivalent slowly and provide improved nutrition for ruminant animals.

It is another object of this invention to provide a method of converting fermented agricultural products and wastes to highly palatable ruminant feeds by catalytic reaction with synthetic carbamide chemicals.

It is still another object of this invention to provide an effective and economical method for converting municipal garbages, feedlot manures and other agricultural wastes which are threats to the environment to pathogen-free, efficaceous feeds for ruminant animals.

It is still another object of this invention to provide a highly palatable feed supplement for ruminant animals which allows effective and safe feeding of a substantial part of the protein requirements of ruminant animals as carbamides.

In accordance with the invention, method is provided for preparing a highly palatable ruminant feed composition by the reaction of carbamides, particularly urea and biuret, and fermented agricultural products, by-products or wastes, said composition providing safe and controlled release of crude protein equivalent nitrogen when ingested by ruminant animals and being suitable for use as a ruminant feed supplement, particularly as a protein supplement, or as a complete ruminant feed. Reaction of carbamides and fermented agricultural products or wastes is catalyzed by dicarboxylic acids containing four to six skeletal carbons. Method comprises steps as follows:

a. Comminuting fermented proteinaceous agricultural products or wastes containing sugars, cellulose, or fats using a strong sheering action to break down the cellular structure of the agricultural product or waste to produce a gel-like, amorphous fluid, and to blend rapidly and completely with the liquid carbamide chemicals, and dicarboxylic acid catalyst, while at the same time carrying out the acid catalyzed first stage chemical reaction to form adducts containing synthetic carbamide chemicals and the sugars, cellulose and fats contained in the fermented agricultural products in a liquid phase at temperatures controlled at about the boiling point of water by hot gases, such as steam, injected directly to remove by stripping all the low boiling amins, acids, aldehydes, and other impurities which cause ruminant feeds to be unpalatable. The fermented agricultural products and wastes may be natural, synthetic, or by-product materials from the agricultural industry which contain the energy and roughages normally required in ruminant feeds. These materials, which have not been successfully reacted with urea and biuret to produce palatable ruminant feeds having properties of slow release of nitrogen, are hereinafter called feedstuff. These materials typically are brewery waste solids and sludges, feedlot manures, sewage treatment sludges, molasses, bagasse, poultry manure, citrus pulp and peels, slaughterhouse wastes, proteinaceous solids produced in secondary waste water treatment, fermented corn silage, fermented milk and cheese products, and the organic portion of municipal garbages. The synthetic carbamide chemicals comprise urea, biuret and triuet which contains large amounts of protein equivalents as nitrogen which can be used as protein substitutes by the ruminant when it is released at about the same rate at which it is assimilated by the animal.

Dicarboxylic acids have been found to act as an effective catalyst for the reaction of the carbamides with the sugars, fats, polysaccharides, and cellulose in the fermented feedstuffs and synergistically improve the palatability of the supplemented feed formed in the process. Best feed compositions and equivalents were produced with aliphatic dicarboxylic acids and anhydrides containing 4–6 skeletal carbons. Altough aromatic acids and anhydrides were found to react, they were generally considered unsuitable as components for animal feeds because of toxicity hazards. Best and most practical dicarboxylic acids and anhydrides for catalyzing the reaction and producing palatable feeds were succinic, maleic, lactic, glutaric, and fumaric. These acids further react with amino fragments from protein fermentation to form insoluble products which improves palatability of fermentation waste.

b. Fluidizing the thoroughly blended, stripped, and partially reacted liqud from the first stage reactor as fine particles into a stream of hot gases under accurately controlled conditions to allow completion of the reaction of the synthetic carbamide chemicals with the feedstuff. Retention time and the temperatures are maintained at such a level that the catalytic reaction is completed and pathogens in the feedstuffs are destroyed without appreciable molecular dehydration, chemical rearrangement, or caramelization of the feedstuff. In this period of time, drying of the reaction mixture is also substantially completed. We have found that temperatures of the fluidized particles in the second stage reaction are best controlled at 100° to 150° C, and the time of heating prior to separation of heating gases from the solids and cooling of the solid product is 15 to 150 seconds. Fluidization of the particles is provided by passing combustion gases and tempering air in an upward direction through the reactor. Combustion gases are produced by the burning of fluid fuels with air, preferably in an external burner. The reaction of the carbamides with the feedstuff to give controlled release is effected and pathogens destroyed when moisture of the said particles has been reduced to about 10% (wt.) or less in the fluid reactor-dryer. The second stage reactor is best operated near atmospheric pressure to allow the necessary reaction temperatures to be reached during drying. For example, high vacuum operation evaporates water at temperatures too low to allow effective reaction of the synthetic chemicals.

c. Separating the fluidized solid ruminant feed product particles from the effluent gases from the second stage reactor, preferably in a cyclonic separator, and withdrawing said particles.

d. Cooling ruminant feed particles to ambient temperature. Particles should be cooled to at least 70° C in 5 minutes or less and preferably cooled to 40° C or lower for prolonged storage. The cooling may be performed by a direct stream of cool air passing through the product on a perforated belt, by tumbling in a drum over cooled pipes, or by any other means in the art, which provides expeditious cooling without addition of appreciable moisture.

The ruminant feed product, thus obtained, is a dry, free-flowing meal composed of particles ranging from about 100 microns to 2000 microns in diameter. The range of particle size can be somewhat wider when feedstuffs with significant fibrous material contents are used as starting materials.

The product may be used in meal form as a total ruminant ration or it may be blended with other ruminant feeds to form a complete ration. Another method for use, which is particularly useful where the product is to be shipped as a ruminant feed supplement, is the formation of pellets by compressing the meal at high pressure.

The ruminant feed obtained by the instant invention contains 20 to 60% (wt.) protein or protein equivalent. The amount of protein equivalent used depends upon the feedstuff used in the process and the end use intended for the product. This protein equivalent may be adjusted to the desired level by simply controlling the ratio of carbamide and feedstuff.

The new method for producing ruminant feeds containing relatively high concentrations of nutrients, particularly proteins and protein equivalents having properties of slow release, from carbamides containing high protein equivalent nitrogen contents, having instant release properties, and fermented feedstuffs from the agricultural industry having poor ruminant palatability and uneconomically low nutrient contents, is an acid catalyzed thermal reaction. The effectiveness of the method depends upon radially reacting the sugars, cellulose, and fats contained in fermented agricultural products and wastes made available by mechanically destroying the nature cellular barriers which normally contain these materials. Reaction is carried out first in a homogeneous liquid phase reaction at temperatures at about the boiling point of water, produced by use of hot stripping gases which we also used to remove low boiling amines, aldehydes, and other chemicals which make feeds unpalatable, and then accurately applying the correct amount of heat, for the desired period of time, in a second reactor to finely divided particles of these reactants, fluidized by heated gases, and then cooling when reaction is completed.

The dicarboxylic acid catalysts which enhance the reaction rates of the carbamides are also effective in decreasing the release rate and increasing the use efficiency of contained or added natural proteins, or alpha amino acids fed to ruminant animals. The dicarboxylic acids, and their anhydrides are both effective. The anhydrides may be added as such directly to the reaction mixture or preferably, formed in-situ by the heat provided in the second stage fluidized reactor.

The fermented portion of the reaction mixture must be free of hard materials which could damage equipment used to reduce particle size, blend, and spray the reaction mixture. Hard particles or agglomerates may be removed from the feedstuffs by settling, sifting, straining, filtering, or any of the solids separation operations known in the art. The feedstruffs portion of the feed may be selected from fermented, natural, synthetic, or waste products from the agricultural industry. These agricultural products contain sugars, cellulose, and fats, and all contain carbonyl groups and function as aldehydes or organic acids. Fermented agricultural industry products which perform especially well are: corn silage, grass silage, sewage sludge, feedlot wastes, fruit wastes, vegetable processing wastes, fermented corn silages, fermented milk products, brewery wastes, and the organic portion of municipal garbage.

The feedstuff carbamide and catalyst portions of the reactants may be preheated by normal means known in the art, if desired. The complete mechanical degradation of the fermented feedstuff and the ratio of the reactants, stripping gas, and catalyst is critical to provide a first stage reactor feed which is essentially fluid, and amorphous. The reactor feed material must be converted to this fluid condition to allow complete reaction of the materials to give the necessary high degree of adduct formation, the stripping of low boiling impurities, and to facilitate spraying as finely divided discrete liquid particles into the hot combustion gases in the second stage fluidized reactor.

The fermented feedstuff charged to the first reactor is comminuted by grinding, crushing, or pulverizing and put into amorphous fluid condition by addition of water, stripping steam, and may have other nutritive liquids added at the same time. Any type of size reduction and liquefaction of the feedstuffs used in satisfactory as long as reactants reach an amorphous fluid condition and the material reacted in the first stage may be readily fluidized as discrete particles in the second stage reactor.

The vessel for carrying out the second stage reaction of the synthetic chemicals with the feedstuffs to produce slow release ruminant feeds and to dry the product is provided with a supply of hot gases and a system for applying the fluid reactants more or less evenly throughout the cross section of the flowing hot gases. Reactor designs can be related to commercially available dryers of the jet, fluid bed, spouting bed, and spray dryer types. Flow of the reactants and solid products is preferably co-current to the flow of the heating gases.

The use of a fluid bed in the second stage reactor provides an opportunity to grow particles of the ruminant feed which are readily handleable without pelleting. The jet reactor is preferred where a finely divided product is desired or where the product is to be pelleted.

DESCRIPTION OF THE INVENTION

The accompanying drawing illustrates the operations of the invention, and the preferred embodiment of the invention is defined by the list of preferred factors and examples of the method which follow:

| Factor | Preferred Range |
| --- | --- |
| Type First Stage Reactor | Shredder-Blender, Turbulizer |
| Type Second Stage Reactor | Jet Dryer, Fluid Bed, Spray Dryer |
| Ratio Feedstuff to Liquid Chemical Fed | 1–10 lbs/lb |
| Ratio Stripping Gas to Feedstuff | 0.1–0.3 lbs/lb |
| First Stage Reactor Effluent Temperature | 70–105° C |
| Second Stage Reactor Effluent Temperature | 85–160° C |
| Average Retention Time in First Reactor | 60–600 seconds |
| Average Retention Time of Solids in Fluidized Reactor | 15–300 seconds |
| Average Particle Size of the Second Stage Reactor Product | 200–2000 microns |
| Fluidizing Gas Velocity in the Fluidized Reactor | 0.5–5.0 ft/sec |
| Protein and Protein Equivalent Content of Product | 20–60 wt. % |
| Moisture Content of Final Product | 4–12 wt. % |
| Quenching Temperature after Second Reactor | 40–70° C |
| Method of Quenching | Direct air cooling |
| Feedstuffs | Brewery waste, feedlot and sewage sludges, fermented whole agricultural plants, corn silage, grass silage, and organic portion of municipal garbage |
| Synthetic Nitrogen Chemicals | Urea, biuret, triuret |
| Reaction Catalysts | Succinic, glutaric, maleic, fumaric, lactic acids, and anhydrides |

Examples of the Invention

EXAMPLE 1

Sludge discharged from a large brewery in the eastern United States consisted of soft wet solids comprising proteins, sugars, phosphorus and other minerals, and water. Analysis of brewery sludge was as follow:

| Material | Wt. % |
| --- | --- |
| Proteins | 4.7 (0.75% N) |
| Carbohydrates (sugars and starches) | 4.6 |
| Crude Fiber | 2.2 |
| Fat (ether extract) | 0.3 |
| Phosphorous | 0.1 (0.20% $P_2O_5$) |
| Low Boiling Amines, Acids, Aldehydes, Ketones | 0.1 |
| Free Water | 80.5 |

The total nutrient content of the sludge was too low to allow commercial shipment or utilization although the quality of the nutrients present in the starting material were desirable in ruminant feeds. The sludge contained proteins, and alpha amino acids such as methionine, lysine, and threonine.

Referring to the attached flow diagram, the brewery sludge was loaded in Feedstuff Hopper 1 and held at ambient temperatures with supply replenished when reservoir got low. The sludge was continuously fed through Line 2 by Conveyor 3. In this series of operations of the conveyor was a Moyno pump employing a stainless steel rotor and a butyl rubber stator. The sludge was fed at a rate of 4.0 tons per hour to First Stage Reactor 4.

A carbamide solution containing dicarboxylic acid catalyst and ammoniated phosphoric acid was prepared in the Synthetic Chemicals Tank 5 to produce a solution containing 139% protein equivalent and 3.7% phosphorous. Solution composition was as follows:

| Material | Wt. % |
| --- | --- |
| Urea (N) | 45.0 (20.7) |
| $H_3PO_4$ (P) | 11.5 ( 3.7) |
| $NH_3$ (N) | 2.0 ( 1.6) |
| Glutaric Anhydride | 2.7 |
| Water | 38.8 |
| Total (N) | 100.0 (22.3) |

The carbamide catalyst solution was fed by metering Pump 6 through Line 7 to the First Stage Reactor 4 at a rate of 200 pounds per hour. The First Stage Reacrtor 4 consisted of a Strong-Scott Turbulizer 14 inches in diameter and operating at 900 revolutions per minute. The rotating blades in the Turbulizer comminuted the sludge particles until they formed a gel-like amorphous fluid with the small amount of steam and concentrated chemicals added. Temperature in the first stage reactor was maintained at 95° C by addition of freeblow steam through line 25. Calculated retention time was about 60 seconds. Free urea was reduced by 20% in sample analyzed from first stage reactor effluent. Lights, including low boiling amines, acids, and aldehydes were vented with steam effluent through line 26.

The partially reacted effluent from the first stage liquid reactor was forwarded through Line 8 to Fluidized Reactor Feed Tank 9 and was pumped through Lines 10 and 12 by Moyno Feed Pump 11 to the Second Stage Fluidized Reactor 13. Air from Blower 14 was supplied through line 15 and natural gas was supplied through Line 16 to the combustion zone of jet type reactor-dryer. The second stage fluidized reactor consisted of a vertical stainless steel pipe 12 inches in diameter and 20 feet tall, with fire brick lining in the combustion zone at the bottom of the reactor.

Temperature in the combustion zone of the reactor was 500° C. The liquid feed was introduced in the pipe by spraying above the combustion zone directly into the combustion gases with added tempering air 17. The finely divided liquid particles injected to the second stage reactor were quickly heated, reacted, and dried. The drying operation consumed heat rapidly and quickly reduced the temperature of the combustion gases discharged to 130° C. The fluidized product particles were carried by the heating gases from the reactor through Line 18 into a cyclone separator which vented the hot gases through Line 22 to the atmosphere and dropped the product solid through Line 20 into Product Cooler 21. Elapsed time between entrance of liquid feed to the fluid reactor stage until the solids started to appear in product cooler was measured to be 15 seconds with average retention time estimated to be 25 seconds.

The product was cooled to 40° C by direct air cooling and was removed through Line 23 at the rate of 1600 pounds per hour. Composition of the ruminant feed product thus obtained is as follows:

| Material | Wt. % |
| --- | --- |
| Protein and Equivalents (N) | 37.0 (5.92) |
| Phosphorous | 0.9 |
| Sugars free and combined | 22.1 |
| Crude Fiber | 9.6 |
| Moisture | 7.6 |
| Fat (ether extract) | 1.0 |

Product was light brown in color, free flowing, and homogeneous in appearance. The product could be readily blended with other agricultural products to form complete ruminant rations or pelleted for marketing as a feed supplement.

EXAMPLE 2

This example demonstrates the use of the invention to convert synthetic carbamide chemicals having rapid ammonia release properties in the rumen to a highly nutritive ruminant feed product having properties of controlled, slow release in rumen fluid, by a first stage mixing, stripping and reaction, and second stage gas fluidized reaction of a fermented agricultural industry by-product having low ruminant feed value. In this example, urea is used as the synthetic carbamide chemical and brewery malt waste slurry is used as the agricultural industry by-product.

In the brewing of beer from malt and other agricultural products a considerable amount of sludge forms in the brewing and storage tanks. This material is frequently drained and flushed from the tanks. It has been discarded in the past, creating high BOD (biological oxygen demands) in nearby streams, and now, with increased environmental attention, requires secondary waste treatment prior to discharge into streams.

In the brewing of beer in a large brewery in the Eastern United States fermented sludge forms from proteinaceous sugars, carbohydrates, polysaccharides, and fats of barley grain used in the manufacture of wort from barley malt. The sludge, formed in the fermentation tank, contained some unfermented grain, spent hops, partially fermented proteins, amino acids, carboxylic acids, sugars, and other carbohydrates, in addition to a large amount of free water containing small amounts of soluble nutrients. Analysis of the sludge removed from the brewing tank was as follows:

| Component | Wt. % |
| --- | --- |
| Protein and Water Insoluble Protein Fragments | 14.0 |
| Fat | 3.7 |
| Succinic Acid | 0.2 |
| Other Carboxylic Acids | 0.2 |
| Crude Fiber | 6.3 |
| Sugars and Carbohydrates (as sucrose) | 3.2 |
| Calcium | 0.15 |
| Phosphorous | 0.30 |
| Ash | 1.9 |
| Free Water | 53.5 |

Amino acid distribution found as part of the protein in the sludge was determined by chromatographic, and wet chemical methods to be as follows:

| Component | Wt. % |
| --- | --- |
| Methionine | 0.29 |
| Cystine | 0.19 |
| Lysine | 0.36 |
| Tryptophane | 0.12 |
| Threonine | 0.39 |
| Isoleucine | 0.68 |
| Histidine | 0.24 |
| Valine | 0.80 |
| Arginine | 0.40 |
| Phenylarginine | 0.90 |
| Glycine | 0.60 |

To 100 pounds of the brewery sludge, defined above, was added as carbamide additive, catalysts, and amino acid fortification the following ingredients:

| Ingredient | Amount |
| --- | --- |
| Methionine (95% dl-amino-4-methylthio-butyric acid) | 2 pounds |
| L-Lysine (95% diaminocaproic acid) | 2 pounds |
| Succinic Anhydrides (95% purity) | 2 pounds |
| Maleic Anhydride (95% purity) | 2 pounds |
| Urea | 6 pounds |

The ingredients above were added in the listed order to a 35 gallon stainless steel open-top water-jacketed tank agitated by turbine propeller operating at 600 rpm with free-blow steam allowed to pass through the reactor. During the agitation period the brewery sludge particles were reduced in size and the cellular structure of the sludge was broken down to produce a homogeneous fluid intimately mixed with the amino acids, carboxylic acid anhydrides, and urea additives. The urea crystals were dissolved and completely mixed with the sugars and other components of the reaction mixture. The heat of the reaction obtained in the first reactor helped maintain the temperature of the mixture as the ingredients were added and the stripping of the low boiling amine aldehyde and other ingredients proceeded. The stripped material was condensed and a sample was analyzed. The condensate was analyzed and the following materials were identified: acetic acid, propionic acid, lactic acid, acetaldehyde, ammonia, and dimethyl amine, diethyl amine, and dipropyl amine.

At the end of a 20 minute reaction period, the gel-like reaction product was fed to a stainless steel reactor made from a Bowen Spray Dryer, 3 feet in diameter and 6 feet in inside height with a coned bottom. The reaction mixture fluid was sprayed downward from a flat 3-inch diameter disc spinning at 2400 rpm. Combustion gases, from burning natural gas in an external burner, were fed tangentially into the reactor-dryer near the top of reactor side wall. Reactor product was removed as dry solids through a chute in the bottom of the reactor cone, and with the effluent combustion gases, which left the reactor through a tangential take-off in the side wall just above the cone section. The effluent gases passed through a cyclone separator to remove entrained solids. The solids from the cone valve and from the cyclone separator were combined in a water jacket-cooled product hopper.

When the amorphous fluid from the first stage reaction was sprayed into the combustion gases in the second stage reactor, it formed droplets. These droplets were fluidized in the combustion gases and followed a generally circular course downward through the reactor and hot gases with the larger particles dropping into the cone at the bottom of the reactor, and the finer particles leaving with the effluent gases.

The particles were quickly heated to the ambient temperature of the gases and simultaneous catalytic reaction and thermal drying started. Temperature in the reactor gas phase throughout the reactor was measured by thermocouples to be 115° C ± 2° C, except in the area of the spray disc and in the solids cones discharge. Temperature of the solids withdrawn from the hopper was 106° C. Accurate measurement at spray disc was not possible.

An adduct formation reactions and the drying of the fluid particles occurred, the particles solidified and agglomerated. The combined solid product withdrawn from the reactor cone section and cyclone separator had a light brown powder appearance. Screen analysis of product indicated that 90% passed through 20 mesh Tyler Screen and 45% passed through an 80 mesh screen. About 100% of the product was retained on a 200 mesh screen. Product amounting to 46 pounds was recovered in dry meal form and subjected to chemical and chromatographic analyses. It was necessary to hydrolyze part of the sample to obtain analyses for the fats, amino acids, and the carboxylic acids. Analytical results obtained were as follows:

| Component | Wt % |
| --- | --- |
| Total Protein Equivalent (N) | 58.0 (9.28) |
| Free Moisture | 5.0 |
| Free, cold water, soluble urea | 1.7 |
| Fats, ether extract after hydrolysis | 8.0 |
| Crude Fiber | 13.7 |
| Sugars (as sucrose) | 6.3 |
| Succinic Acid (after hydrolysis) | 4.8 |
| Maleic Acid plus other carboxylic acids (after hydrolysis) | 4.8 |
| Methionone (after hydrolysis) | 4.1 |
| L-Lysine (after hydrolysis) | 4.1 |
| Calcium | 0.3 |
| Phosphorous | 0.6 |
| Ash | 4.1 |

Of the total protein equivalent in the product 51% was derived from natural proteins and partially fermented protein fragments. The remaining 49% of the protein equivalent was contributed by polypeptide imides formed by reaction of succinic and maleic acid anhydrides with L-lysine and methionine and urea-sugar adducts. The polypeptide imides amounted to 17.8% by weight of the product and carbamide nitrogen content from the urea-sugar adducts amounted to 1.38% by weight.

Ten grams of the product was stirred into 90 grams of distilled water for 15 minutes, and pH was measured to be 5.6.

EXAMPLE 3

This example demonstrates the slow release of protein and protein equivalent of the new feed composition in rumen fluid. A sample of the product from Example 1 was compared with a mixture of the ingredients which had not been reacted into the new composition. Comparison was made in in-vitro fluid which had been freshly taken from a fistulated Hereford steer. The control and test samples were diluted and buffered, and the total nitrogen concentration in each of the 5 milliliter samples was brought to 0.003% (wt). Data taken in the test are as follows:

| Product | Total Ammonia Content in Rumen Micrograms/ml at Elapsed Times | | |
| --- | --- | --- | --- |
|  | Original | 30 Minutes | 200 Minutes |
| Ex. 1 product | 15 | 59 | 118 |
| Ex. 1 ingredients | 10 | 165 | 1150 |

Chromatographic analyses showed no detectable methionine nor L-lysine dissolved in the rumen fluid from the Example 1 product after 20 minutes, but showed both materials to be dissolved from the control sample of unreacted ingredients sample almost instantly.

EXAMPLE 4

This example demonstrates the effective absorption of the amino acids, proteins, and carbamide nitrogen from the new feed composition by ruminants and the synergistic improvement of the new composition over its ingredients. Tests were run in a Hereford steer weighing approximately 1000 pounds which had a surgically installed fistula to allow access to the rumen.

A 50 gram sample of the product from Example 1 was added directly into the rumen through the fistula, and samples of rumen fluid were withdrawn and analyzed chromatographically, 15, 30, and 100 minutes after the sample addition. No free methionine or L-lysine were found in these samples.

A blood sample was withdrawn from the steer 12 hours after sample addition, and analyzed chromatographically. Maleic and succinic acids were found in the flood stream indicating that the amino acids protected through the rumen had been released to the blood in the abomasum and small intestine. Free methionine and L-lysine were also identified in the blood stream.

The same amount of the ingredients used in Example 1 was tested in the same manner with samples withdrawn and analyzed after 5, 15, and 100 minutes. Free methionine and L-lysine and free ammonia from urea degradation were found in large amounts in the 5 minute sample. Essentially all ingredients were dissolved and a large portion of the urea was decomposed in 100 minutes. No increase in the methionine and L-lysine content was found in blood samples withdrawn after 12 hours.

EXAMPLE 5

This example demonstrates improved performance of cattle fed the new proteinanceous feed additive composition, compared to the animal performance when fed the same amount of nutritional equivalents, normally fed commercial cattle, but which had not been reacted to give the new composition. Composition used in this example is the product from Example 1. Feeding trials were conducted with the cattle receiving balanced and complete rations with essentially the only difference being in the nitrogen supplement feed.

In the 145 day feeding trial 20 cross bred yearling steers were used. Ten animals were fed the control feed composition listed below and ten were fed the ration listed below containing product from Example 1.

Compositions of the feeds were as follows:

| Ingredient - Wt % | Control | Ex. 1 |
| --- | --- | --- |
| Ground Corn | 79.5 | 78.0 |
| Peanut Hulls | 19.7 | 5.3 |
| Urea Prills | 1.7 | — |
| Example 1 Product | — | 16.0 |
| Limestone | 0.30 | 0.30 |
| Defluorinated Phosphate | 0.21 | — |
| Trace Minerals | 0.32 | 0.32 |

The improvement in utility of feeds with the product from Example 1 over the control is clearly seen by the results of nitrogen balance studies made on the animals. These data are recorded in the following table:

| Nitrogen Balance grams N/day | Control | Ex. 1 |
|---|---|---|
| Nitrogen Intake | 76.6 | 81.1 |
| Urinary Nitrogen | 34.1 | 32.1 |
| Fecal Nitrogen | 21.9 | 23.2 |
| Nitrogen Retention | 20.6 | 25.8 |

The results of the nitrogen balance work are born out by the actual weight gain performance by the animals on the control feed and the feed containing product from Example 1.

Animal performance of the two groups of animals are summarized in the following table.

| | Feed | |
|---|---|---|
| Performance Factor | Control | Ex. 1 |
| Number of Animals | 10 | 10 |
| Days on Feed | 145 | 145 |
| Average Initial Weight - lbs | 660 | 650 |
| Average Final Weight - lbs | 1027 | 1100 |
| Average Daily Gain, lbs/day | 2.53 | 3.11 |

Animals receiving the Example 1 feed and less corn gained at a rate 1.23 times as fast as the animals receiving the standard control feed ration.

EXAMPLE 6

This example demonstrates the method for the preparation of improved feeds from fermented cheese sludge and carbamides.

Sludge and waste slurries from the fermentation of milk to cheese was analyzed and found to contain 2.8% free amino acids covering a wide spectrum and including L-lysine, riboflavin, and methionine and a total protein content of 13.6%. Addition of this material to rumen fluid in a fistulated steer gave an immediate release of the amino acids and most were degraded prior to digestion in the abomasum and small intestine.

To this waste sludge precipitated from cheddar cheese production by-product was added 1.2 mols of maleic acid anhydride per amine group in the amino acids and enough biuret to produce 1.8% biuret in the form of adduct in the final product. Reaction was carried out in the manner of Example 1.

Product evaluation showed reaction gave delayed release of the carbamide and amino acid nitrogen in rumen fluids and that amino acids were effectively digested in the abomasum and small intestine of the test steer.

The release of the biuret content was slowed drastically over that of the unreacted biuret in in-vivo tests using a fistulated steer for ammonia release rate measurements.

EXAMPLE 7

This example demonstrates the effective preparation and composition of the new feed additive supplement from fermented agricultural fodders, specifically fermented corn silage, using maleic anhydride as catalyst.

Corn silage was prepared for the experiment by cutting the whole plant from a field of hybrid dent corn, in the early dent stage. The crop was chopped to an average particle length of about one inch. Moisture content of the corn was 69%. The chopped corn was blown into a silo 10 feet in diameter and 28 feet high, and sprayed with about 6 gallons of water per ton of chopped corn plant. The corn thus placed in the silo was allowed to ferment for 90 days, before it was evaluated, analyzed, and then catalytically reacted to form the new ruminant feed.

Corn silage quality at the end of 90 days fermentation appeared to be good from the standpoint of odor and appearance. pH of the silage, determined by mixing 5 grams silage with 45 grams distilled water was 3.95. Analysis of silage was made with results as follow:

| Component | Wt % |
|---|---|
| Acetic acid | 1.3 |
| Propionic acid | 0.3 |
| Butyric acid | 0.1 |
| Lactic acid + other high boiling monocarboxylic acids | 2.4 |
| Succinic acid | 0.21 |
| Other dicarboxylic acids | 0.12 |
| L-lysine | 0.30 |
| Methionine | 0.17 |
| Tryptophane | 0.20 |
| Other amino acids and protein fragments | 1.36 |
| Ammonium nitrogen - N | 0.01 |
| Other nonprotein nitrogen | 0.07 |
| Total Crude Protein Equivalent | 3.10 |
| Moisture Content of Silage after 90 days | 61.00 |

The silage was transported to a feed hopper for catalytic reaction with the carbamide concentrate, and continuous feed from the hopper to the first stage comminution, stripping, and reaction. Also pumped to this first stage reactor was the nonprotein concentrate with the following composition:

| Component | Wt % |
|---|---|
| Urea | 50.0 |
| Molasses | 10.0 |
| Water | 40.0 |

Also pumped to the first-stage reactor continuously was the molten maleic anhydride catalyst.

Feed rates sent to the first-stage reactor were 5 tons/hr silage, 1.1 tons/hr urea solution, and 100 pounds/hr of maleic anhydride. The feed materials entered the first-stage reactor which consisted of a Strong-Scott Turbulizer, 14 inches in diameter and operating at 900 revolutions per minute. The rotating blades in the Turbulizer broke down the cellular structure of the corn silage forming a thin fluid which was completely amorphous and homogeneous. All parts of the silage was available for reaction with the catalyst and the urea and for stripping by the steam injected into the highly agitated reactor. Free-blow steam was injected in the inlet end of the Turbulizer and served to strip light materials from the mixture throughout its passage through the reactor. Steam and stripped material was vented from the discharge end of the Turbulizer. Temperature at the Turbulizer discharge was 103° C and pressure was atmospheric.

The amorphous fluid from the Turbulizer was pumped by Moyno pump continuously to the second-stage fluidized reaction. Heat was supplied to this reaction by use of natural gas combustion gases supplied directly to a jet-type reactor dryer. This fluidized reactor-dryer consisted of a vertical stainless steel pipe 12 inches in diameter and 20 feet tall with fire brick lining in the combustion zone at the bottom of the reactor.

Temperature in the combustion zone of the reactor was 650° C. The amorphous gel-like fluid from the first reactor was introduced in the fluidized reactor by spraying above the combustion zone into the combustion gases, along with tempering air to control temperature. The amorphous fluid formed finely divided liquid particles which were quickly heated by the ambient gases, were reacted, and dried. The reaction and drying processes quickly reduced to the ambient gas temperature so that the temperature of the gases discharged were 123° C.

Product particles were recovered from the effluent gases in a cyclone separator and cooled quickly. Average retention time of the reaction particles in the fluidized reactor was estimated to be 20 seconds. Product recovery rate was 2.65 tons per hour.

Composition of the ruminant feed product obtained from the cooler was as follows:

| Component | Wt % |
| --- | --- |
| Protein Equivalent | 31.9 |
| Moisture | 3.1 |
| Acetic Acid | 0.2 |
| Propionic and Butyric Acids | 0.1 |
| Dicarboxylic Acids | 2.4 |
| Lactic Acid + Other High Boiling Monocarboxylic Acids | 2.2 |
| pH (5 grams in 45 grams water) | 5.3 |

The product was brown in color, free flowing, and homogeneous in appearance and analysis. The product had a very faint, mild caramel odor.

Small dry ice-acetone sample traps on the gaseous effluents from both the first and second stage reactors condensed a liquid which was analyzed by gas chromatography and shown to contain acetic and propionic acids, acetaldehyde, ammonia, and diethylamine, confirming the indication from the product analyses, that most of these materials were removed from the products.

In-vitro and in-vivo evaluations of the product from this example released ammonia in the rumen of a steer at a rate significantly slower than did the reactants which had not been carried through the process. These evaluations also showed that the amino acids, lysine and methionine were not released in the rumen, but were released in the abomasum and small intestine.

Free choice feeding tests of the material from this example and with the ingredients containing no catalyst, and without the first stage reaction showed that palatability of the feed supplement was greatly improved by the reaction. It was also demonstrated that the 1000 pound steer test animals had a very poor acceptance of the ingredients of themselves, or reacted without the use of the dicarboxylic acid catalyst.

EXAMPLE 8

This example demonstrates the reaction of manure to produce a useful and safe ruminant feed supplement.

Manure was collected for a period of 7 days from the stable housing 10 young Black Angus bulls weighing about 550 pounds each. The manure, containing some straw which could not be readily separated, was composited, sampled, and analyzed. Composition was as follows:

| Component | Wt % |
| --- | --- |
| Protein, including partially degraded fragments, and amino acids | 10.1 |
| Other solids, including polysaccharides, fats, fiber and inerts | 35.9 |
| Moisture | 50.6 |
| Mono- and dicarboxylic acids | 3.4 |
| pH of 5 grams in 45 ccs distilled | |

-continued

| Component | Wt % |
| --- | --- |
| water | 7.3 |

Infra-red analyses showed carboxylic acid total included presence of uric, glutamic, succinic, lactic, propionic, and acetic carboxylic acids in addition to numerous other carboxylic acids present in amounts too small for ready analysis. Amino acids identified qualitatively by chromatographic analyses included methionine and L-lysine. Microscopic analysis of manure showed presence of live microbial population.

After a run-in period to bring the apparatus to a steady state condition, requiring about 1 hour, the manure was fed at a rate of 100 pounds per hour to the first-stage reactor. The first-stage reactor consisted of a Strong-Scott Turbulizer 14 inches in diameter and operating at 900 revolutions per minute. Free-blow steam was added to the inlet of the Turbulizer and the reactor was steam-jacketed using steam at 5 psig pressure. The rotating blades in the Turbulizer comminuted the manure until all cellular structure was destroyed and an amorphous homogeneous fluid was formed which included the added urea liquor-acid solution. the amount of urea-acid solution added was 20 pounds per hour. Composition of this solution was as follows:

| Component | Wt % |
| --- | --- |
| Urea | 25.0 |
| Phosphoric Acid | 5.0 |
| Maleic Acid | 10.3 |
| Water | 59.7 |
| | 100.0 |

Temperature of the reaction mixture during the first-stage reaction was 98° C and part of the stripping steam was condensed in a cold trap. Analysis of this cold trap sample showed presence of ammonia, acetic acid, light aliphatic amines, and small amounts of aldehydes, ketones, and organic acids. pH of the effluent from the first-stage reactor was 3.1 (5 grams in 45 ccs distilled water).

The fluid from the first-stage was pumped to the second stage fluidized reactor and the reaction was carried out in the manner of Example 7 with a reaction temperature of 140° C, followed by cooling to ambient temperature. Product was removed by cyclone separator from the gas stream effluent of the jet reactor. Average retention time of the solids in the reactor was estimated to be 40 seconds, basis of time required for first product to go completely through the system. After cooling to 40° C, product was analyzed with composition as follows:

| Component | Wt % |
| --- | --- |
| Crude Protein equivalent | 41.6 |
| Carboxylic acids | 4.1 |
| Phosphorous | 0.5 |
| Moisture | 2.1 |
| pH (5 grams in 45 ccs dist. water) | 4.1 |

Product recovered amounted to 58.6 pounds per hour. Product was dark brown, free-flowing, homogeneous, fine, and was formed into $\frac{1}{8}$ inch diameter × approximately $\frac{3}{8}$ inch long pellets by passing through a California laboratory model extrusion-type pellet mill.

Microscopic examination of a slide smear of the ground product showed no microbial activity. Product evaluations by "in-vitro" and "in-vivo" techniques previously described showed that slow release of the urea nitrogen was obtained in the rumen and that the protein, protein fragments and amino acids were protected through the rumen but was released in the lower digestive tract of the ruminating animals.

EXAMPLE 9

This example demonstrates the use of the organic portion of municipal garbage to produce a useful and safe feed supplement.

Garbage collected in metropolitan areas of the eastern United States contained 12% or organic matter available for conversion to ruminant feeds. The partially fermented organic material was recovered as a pulp-like slurry after mechanical separation of the glass, plastic, paper, aluminum, ferrous and heavy metals was completed. Composition of the organic pulp containing 75% moisture, was as follows (dry basis):

| Component | Wt % |
| --- | --- |
| Protein, including partially degraded fragment, and amino acids | 7.9 |
| Fats | 5.3 |
| Polysaccharides, including sugars | 13.5 |
| Mono- and Dicarboxylic Acids | 3.3 |
| Fiber and Inerts | 70.0 |

Analyses showed carboxylic acid total included glutaric, succinic, lactic, propionic, butyric, and acetic acids in addition to small amounts of numerous other carboxylic acids. Amino acids identified qualitatively included methionine and L-lysine. Microscopic examination of the pump showed presence of live microbial population.

After a two hour operating period to bring the apparatus to steady state condition, the garbage slurry was fed continuously at a rate of 2000 pounds per hour to the first stage reactor. The first stage reactor consisted of a Strong-Scott Turbulizer, 14 inches in diameter and operating at 900 rpm. Free-blow steam was added to the inlet of the Turbulizer and the reactor was steam-jacketed, using steam at 8 psig pressure. The rotating blades completed the destruction of the small amount of cellular structure, remaining after the mechanical separation of the garbage and formed a homogeneous fluid which included the urea-acid catalyst solution, added continuously at a rate of 15 pounds per hour. Composition of urea-acid catalyst solution was as follows:

| Component | Wt % |
| --- | --- |
| Urea | 50.0 |
| Glutaric Acid | 12.0 |
| Water | 38.0 |

Temperature of the reaction mixture during the first stage reaction was 97° C. Analysis of the stripping steam from the first reactor showed that ammonia, light aliphatic amines, aldehydes and light organic acids were removed by the stripping action. pH of the first stage liquid effluent was 3.0.

The fluid from the first stage was pumped to the second stage fluidized reactor and the reaction was completed in the manner of Example 7 with a reaction temperature of 140° C. Average retention time of the solids was estimated to be 45 seconds. After cooling to 42° C, product was analyzed and composition was a follows:

| Component | Wt % |
| --- | --- |
| Crude protein equivalent | 31.2 |
| Carboxylic acids | 1.9 |
| Polysaccharides sugars | 12.9 |
| Moisture | 3.3 |
| pH (5 grams in 45 ccs dist. water) | 4.3 |
| Fiber, inerts (dry diff.) | 46.4 |
| | 100.0 |

The product recovered amounted to 56.6 pounds per hour, was dark brown in color, homogeneous, and ready for pelleting into ¼ inch diameter × ⅜ inch long pellets by a California laboratory model extrusion-type pellet mill.

Microscopic examination showed no microbial activity in the product, and "in-vitro" techniques in cattle rumen fluid showed that the reduced rates of release of the urea nitrogen were obtained, and that the protein, protein fragments, and amino acids were protected from rapid degradation by the rumen fluid.

I claim:

1. A method for preparation of feeds, highly palatable to ruminant animals, having increased protein equivalent content and said protein equivalent having improved properties of delayed release, by the reaction of fermented proteinaceous agricultural products with carbamides catalyzed by aliphatic dicarboxylic acids comprising:

a. combining one to ten parts fermented proteinaceous agricultural products with one part of carbamide solution containing an aliphatic dicarboxylic acid having between 4 and 6 skeletal carbons, said dicarboxylic acid amounting to between 0.05 and 5.0% of the total reaction mixture, in a first stage reactor fitted with internal rotating blades to provide mechanical mixing and to destroy the physical integrity of the fermented products thereby producing a homogeneous liquid, maintaining reactor temperatures between 70° and 105° C, injecting heated stripping gases amounting to between 10 and 30% by weight of the carbamide solution into the homogeneous liquid to remove low boiling impurities which cause poor feed palatability, venting the stripping gases containing said impurities from the reactor, and retaining the homogeneous liquid reactants in the first stage reactor for a period of time between 1 and 10 minutes;

b. feeding the homogeneous liquid effluent from the first stage reactor to the second stage reactor and spraying the liquid into said second stage reactor as discrete, finely divided droplets;

c. completing the catalytic reaction of the finely divided droplets of carbamide and fermented agricultural products to form solid adduct product particles by fluidizing the said carbamide and fermented agricultural products in an upwardly flowing stream of heated gases, wherein the retention time of the carbamides and fermented agricultural products in the second stage reactor is between 15 and 300 seconds, at temperatures between 85° and 160° C;

d. removing the solid adduct product from the heated zone of the second stage reactor and cooling said product to 40°-70° C.

2. A method for preparation of highly palatable ruminant feeds from urea, and fermented proteinaceous wastes with said ruminant feeds having protein equivalent values higher than the original wastes and slower nitrogen release in the rumen than the original protein equivalents provided by the urea, comprising:

a. reacting one to ten parts of fermented proteinaceous wastes with one part aqueous urea containing one to ten percent by weight of an aliphatic dicarboxylic acid containing between 4 and 6 carbon atoms, and heated gases amounting to between 10 and 50% by weight of the aqueous urea in a well agitated continuous first stage reactor to form, from said ingredients, a homogeneous liquid, and maintaining a temperature between 85° and 105° C for between 1 and 10 minutes at atmospheric pressure;

b. feeding the homogeneous liquid from the first stage reactor to a second stage reactor wherein said homogeneous liquid is sprayed to form liquid droplets which are fluidized by combustion gases, and excess air, flowing said combustion gases and excess air in an upward direction through said second stage reactor at velocities between 0.7 and 5.0 feet per second at about 1 atmosphere pressure, heating the liquid droplets to between 150° and 160° C for between 30 and 100 seconds to bring about a chemical reaction of urea with the sugars, fats, and polysaccharides contained in the fermented proteinaceous wastes to form adducts, and to complete the drying of the liquid droplets to finely divided solid particles;

c. and removing the finely divided solid particles of reacted product from the second stage reactor and cooling said particles by direct contact with air to 45° C in about 5 minutes.

3. The method of claim 2 wherein highly palatable ruminant feeds are prepared by the reaction of fermented agricultural wastes and urea catalyzed by dicarboxylic acids or anhydrides selected from the group consisting of: succinic acid, succinic anhydrides, maleic acid, maleic anhydride, glutaric acid, and glutaric anhydride.

4. The method of claim 2 wherein highly palatable ruminant feeds are prepared by the acid catalyzed reaction of urea with the fermented proteinaceous wastes selected from the group consisting of: brewers sludge, spent brewers grain, corn silage, feedlot manure, and the organic portion of municipal garbage.

5. The method of claim 2 wherein highly palatable ruminant feeds are prepared by the acid catalyzed reaction of buiret with fermented proteinaceous wastes.

* * * * *